United States Patent [19]

Shishkin et al.

[11] Patent Number: 4,925,550
[45] Date of Patent: May 15, 1990

[54] BATCH-ACTION APPARATUS FOR FILTERING FLUID MEDIUM

[76] Inventors: Viktor V. Shishkin, ulitsa Festivalnaya, 16, kv. 5; Nikolai F. Kryazhevskikh, ulitsa Krasnykh Partizan 559, kv. 13; Jury P. Shapovalov, ulitsa Turgeneva, 18, all of Krasnodar, U.S.S.R.

[21] Appl. No.: 113,817

[22] PCT Filed: Dec. 12, 1986

[86] PCT No.: PCT/SU86/00138
§ 371 Date: Jul. 28, 1987
§ 102(e) Date: Jul. 28, 1987

[87] PCT Pub. No.: WO87/03824
PCT Pub. Date: Jul. 2, 1987

[30] Foreign Application Priority Data

| Dec. 24, 1985 | [SU] | U.S.S.R. | 3988613 |
| Dec. 24, 1985 | [SU] | U.S.S.R. | 3988615 |
| Dec. 24, 1985 | [SU] | U.S.S.R. | 3988603 |
| Dec. 24, 1985 | [SU] | U.S.S.R. | 3988602 |
| Dec. 24, 1985 | [SU] | U.S.S.R. | 3988606 |
| Dec. 24, 1985 | [SU] | U.S.S.R. | 3988601 |
| Dec. 24, 1985 | [SU] | U.S.S.R. | 3988609 |
| Dec. 24, 1985 | [SU] | U.S.S.R. | 3988610 |
| Dec. 24, 1985 | [SU] | U.S.S.R. | 3988614 |

[51] Int. Cl.⁵ .................. B01D 33/00; B01D 29/12
[52] U.S. Cl. .................. 210/106; 210/111; 210/113; 210/193; 210/223; 210/333.01; 210/354; 210/356; 210/391; 210/398; 210/407; 55/305; 55/350; 55/482; 55/485

[58] Field of Search ............... 210/111, 113, 106, 354, 210/356, 391, 398, 223, 193, 297, 332, 333.01, 335, 407; 55/274, 305, 100, 101, 350, 482, 485, 262; 209/274, 310, 275, 379

[56] References Cited

U.S. PATENT DOCUMENTS

| 34,499 | 2/1862 | Holmes | 209/310 |
| 3,931,015 | 1/1976 | Jenkins . | |
| 4,131,546 | 12/1978 | Olsson | 210/407 |
| 4,283,281 | 8/1981 | Cogan . | |
| 4,370,153 | 1/1983 | Russell | 55/304 |

FOREIGN PATENT DOCUMENTS

| 2124717 | 5/1971 | Fed. Rep. of Germany . |
| 2011513 | 1/1987 | Japan . |
| 109199 | 3/1956 | U.S.S.R. . |
| 117204 | 3/1958 | U.S.S.R. . |
| 449025 | 6/1936 | United Kingdom . |

Primary Examiner—David L. Lacey
Assistant Examiner—Thomas M. Lithgow
Attorney, Agent, or Firm—Ladas & Parry

[57] ABSTRACT

A batch-action apparatus for filtering a fluid medium comprises a hermetically sealed housing (1) communicating with systems (9, 10 and 11) for feeding the fluid medium, discharging the clean medium, and evacuating filter cake.

The housing (1) accommodates a flexible filter hose (2) one end (4) of which is turned inside out and attached to the housing (1), whereas the other end (7) thereof is connected to a hoisting mechanism (3) acting to move the hose (2) relative to the fixed end (4) of this hose. The end (4) of the hose (2) turned inside out forms an annular cavity (8) to which the fluid medium is fed and which varies in volume under the action of filter cake build-up or in response to the movement executed by the hoisting mechanism (3).

13 Claims, 5 Drawing Sheets

BATCH-ACTION APPARATUS FOR FILTERING FLUID MEDIUM

FIELD OF THE INVENTION

This invention relates to cleaning fluid media (liquid and gaseous), and more particularly concerns a batch-action apparatus for filtering a fluid medium. The apparatus can also be used for separating a fluid medium into fractions in a range of industrial applications.

BACKGROUND OF THE INVENTION

At present, cleaning liquids and gases from various impurities, and separating substances into fractions poses a serious problem. The problem is especially acute when cleaning gases and sewage water in the chemical and petroleum refining industires, in cattle-raising farms, public utilities, ferrous and non-ferrous metallurgy.

There are known apparatus for filtering liquid and gaseous media, each such apparatus comprising a housing accommodating a filtering element and communicating with systems for feeding a medium to be filtered, discharging the clean medium, and evacuating filter cake. Depending on the type of the medium being filtered, used is generally made of filtering elements of a range of designs, such as endless belts, mashes, permeable membranes, etc.

For example, there is known a batch-action apparatus (SU, A, 109199) for cleaning fluid media, in which bag-type filtering elements are secured on two plates of which one such plate is capable of movement for periodically shaking filter bags to remove filter cake from their inside surface.

These apparatus are, however, bulky and inefficient, whereas the filter bags have a tendency to foul and therefore fail to carry out their function; another disadvantage being that the mechanism for shaking the filter bags is also prone to premature failure.

There is known an apparatus (SU, A, 117204) for filtering a fluid medium (liquid) the housing of which accommodates a flexible filtering element in the form of a flexible bag-shaped vessel of a filtering material an open end of which is secured to the housing. The bottom of the vessel is connected by a tie rod to a hoisting mechanism serving to turn the vessel inside out to remove filter cake; this vessel being thus capable of movement relative to the point of its attachment.

The apparatus is structurally simple, although inefficient, since during feeding a batch of the liquid to the vessel cake build-up and clogging of the filtering surface hampers the filtration process, and therefore the vessel needs frequent turning inside out to evacuate the filter cake, which is time consuming.

SUMMARY OF THE INVENTION

The invention is directed toward the provision of a batch-action apparatus for filtering a fluid medium (liquid or gas) in which a flexible filtering element would be so constructed as to enable, depending on filter cake build-up and the extent to which the filter surface is clogged therewith, to automatically place clean portions of this element to the filtering zone, which ensures higher efficiency, simpler operation, and more reliable cleaning of the filtering surface.

The aims of the invention are attained by that in a batch-action apparatus for filtering a fluid medium comprising a housing communicating with systems for feeding a fluid medium to be filtered, discharging the clean medium, and evacuating filter cake, and a flexible filtering element secured to the housing and moved relative to the point of attachment thereof by a hoisting mechanism, according to the invention, the housing is hermetically sealed and is divided by the flexible hose-shaped filtering element into two chambers, of which the upper chamber accommodates the hoisting mechanism to which the flexible filter hose is connected by one end, whereas the other end of the hose is turned inside out to be secured to the circumference of the housing forming about the rest of the hose an annular cavity changing in volume as filter cake builds up therein and the hose is moved by the hoisting mechanism, the upper chamber communicating with the system for evacuating filter cake.

The hermetic sealing of the housing makes it possible to use the apparatus for filtering acrid or poisonous media, an overpressure can be further provided in the upper chamber and an underpressure in the lower chamber underlying the filtering element for attaining a higher filtration efficiency. The employment of the flexible filter hose allows to move the hose under the action of filter cake build-up to place clean portions of the hose in the filtration zone, which likewise increases filtration efficiency and extends the operation cycle of the apparatus.

Preferably, the hoisting mechanism has the form of a drive drum having a flexible pull member wound thereon, and connected to the end of the filter hose, and a means for adjusting the torque of the drum, such an arrangement enabling the hose to move for the volume of its annular cavity to expand under the action of the weight of filter cake build-up, or in response to the pressure of the fluid medium, thus ensuring a more complete utilization of the filtering capacity of the material of the filter hose.

Alternatively, the flexible pull member of the hoisting mechanism can be connected to the end of the filter hose through a flexible ring element, jets communicating with the system for feeding the fluid medium being preferably arranged at both sides of the filter hose for evacuating filter cake from the filtering surface thus rendering it clean. The fexible ring element is intended to serve as a lock means for drawing together the open end of the filter hose as the latter is raised by the hoisting mechanism, whereby the fluid medium, in this case preferably liquid, is delivered for filtration from the bottom of the apparatus.

In order to ensure a more thorough cleaning of the filtering surface of the hose from filter cake, it is advisable to provide at both sides of the filter hose scrapers in the form of perforated plates having an internal passage communicating with the system for feeding the fluid medium to be filtered.

According to one more alternative modification of the apparatus, the upper chamber above the flexible filter hose is divided into two sections by a partition wall having a slot opening with sealing elements extending lengthwise of the opening, the upper portion of the chamber accommodating a hoisting mechanism fashioned as a hermetically sealed hose threaded by one end thereof through the slot opening of the partition wall to extend to the lower portion of the chamber and connected to the flexible filter hose, the other end thereof being turned inside out and attached to the inside periphery of the hosing to form an annular chamber above the partition wall filled with a compressible fluid under pressure.

This arrangement allows to unify the major parts (viz., filter hose and hoisting mechanism) and thereby simplify operation and servicing of the apparatus. Preferably, the partition wall has passages communicating with the system for evacuating filter cake and extending to the lower part of the chamber at both sides of the filter hose scrapers secured on the partition wall, which ensures a more reliable removal of filter cake from the filtering surface of the filter hose.

To ensure a finer filtration of the fluid medium, the interior of the flexible filter hose accommodates coaxially additional hoses with ends of each such hose being turned inside out to be successively attached to the inside periphery of the housing and form annular chambers communicating with the system for discharging the clean fluid medium.

In order to ensure removal of metallic inclusions from a liquid medium to be filtered, it is advisable that the additional hoses be fabricated from an electrically conductive material and wired to outside power sources.

One more alternative modification of the proposed apparatus envisages that the interior of the housing underlying the flexible filter hose is provided with a perforated tubular member arranged coaxially inside the housing and communicating with the system for feeding the fluid medium to be filtered.

Such an arrangement makes it possible to use the same filters both for fine and coarse filtering of the fluid medium.

According to yet another modification of the proposed apparatus, the annular cavity of the filter hose is occupied by a filtering filler material, the housing accommodates additional vessels communicating with the upper chamber of the housing disposed above the filter hose, each of these vessels communicating in its bottom portion with the system for evacuating filter cake and being provided with a means for washing the filtering filler in the form of a flexible hose and a drive drum to which one end of the flexible hose is secured, the other end of this flexible hose being turned inside out and attached to the inside periphery of the walls of the additional vessel.

This arrangement allows to mechanize the process of feeding the filtering filler to the annular cavity of the filter hose and discharging the filler material from the hose for washing.

In view of the foregoing, the proposed apparatus is easy and efficient in operation.

BRIEF DESCRIPTION OF THE DRAWINGS

The invention will now be described in greater detail with reference to the accompanying drawings, in which.

BEST MODE OF CARRYING OUT THE INVENTION

Figure 1:
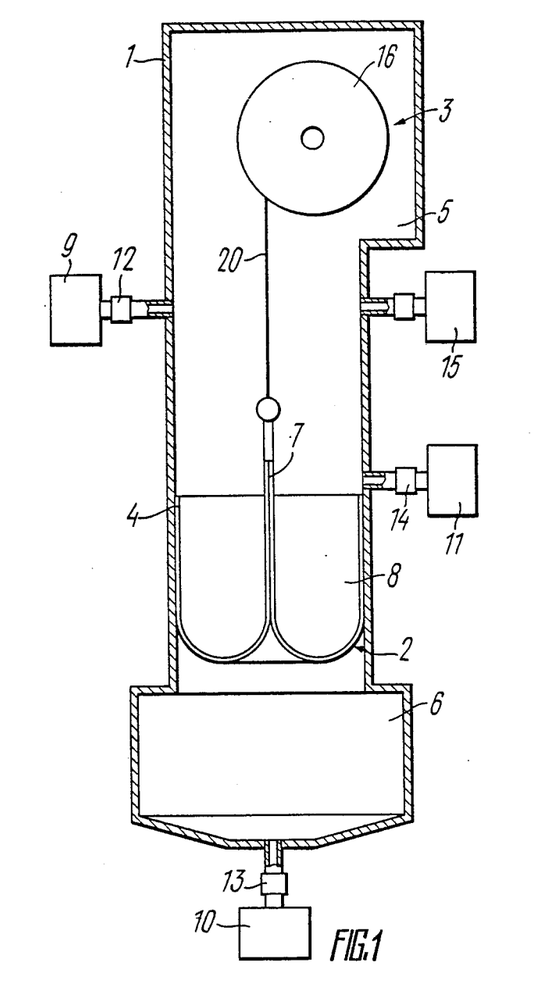
FIGS. 1 to 3, 5, and 7 to 9 are schematic representations of the apparatus according to the invention.
Figure 2:
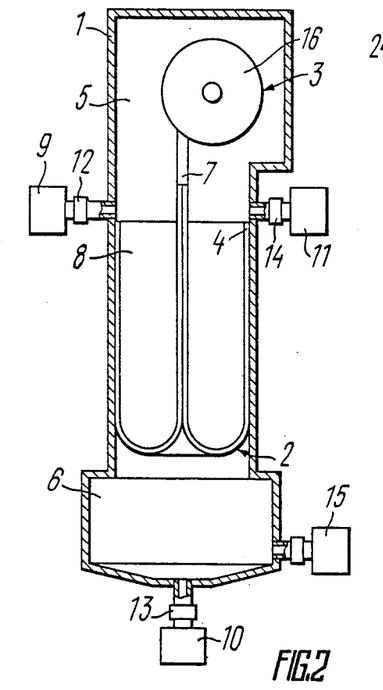

With reference to FIGS. 1 and 2, the batch-action apparatus for filtering a fluid medium (liquid or gas) comprises a hermetically sealed hollow housing 1 accommodating a flexible filtering element 2 capable of being moved by a hoisting mechanism 3 relative to the part of the housing to which it is attached.

The filtering element 2 is fashioned as a hose fabricated from any known suitable material selected depending on the type of medium to be filtered (liquid or gas), the degree to which this medium is to be filtered, and the field of industry where the proposed apparatus is to be employed.

The filtering element 2 (hereinafter referred to as hose 2) is turned inside out at one end thereof and is attached to the periphery of the inside surface of the housing 1 to divide the interior of this housing 1 into two chambers, particularly upper chamber 5 and lower chamber 6. The other end 7 of the hose 2 is secured to a hoisting mechanism 3. Thanks to securing of the end 4 of the hose 2 turned inside out to the housing 1, an annular cavity 8 is formed to which a medium to be filtered is supplied and which is capable of changing its volume under the pressure exerted by the medium being filtered or under the action of the hoisting mechanism to expand as the hose 2 is gradually lowered and unfolded, or to contract as the hose is raised by the hoisting mechanism 3. The hoisting mechanism 3 is located in the chamber 5 above the hose 2.

The apparatus also has a system 9 for supplying the medium to be filtered, a system 10 for discharging the clean medium, and a system 11 for evacuating filter cake; all for these systems 9, 10 and 11 communicating through non-return valves 12, 13 and 14, respectively, with the chambers 5 or 6 of the housing 1, depending on the desired procedure for feeding the medium to be filtered and evacuating the filter cake. For example, the chamber 5 communicates continuously through a valve 14 with the system 11 for evacuating the filter cake, and also can communicate through a non-return valve 12 with the system 9 for supplying the medium to be filtered.

Figure 3:
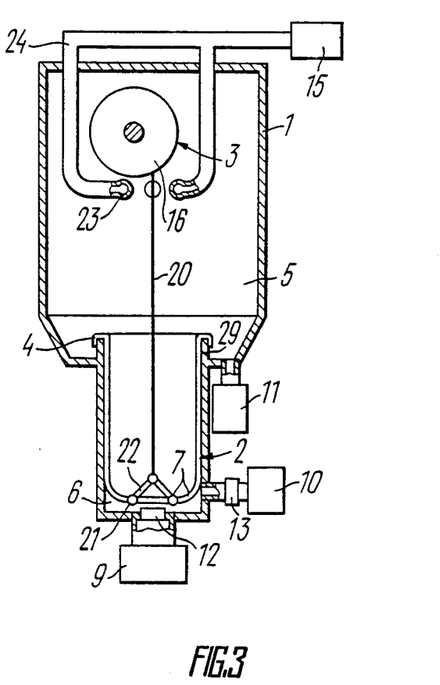
Figure 4:
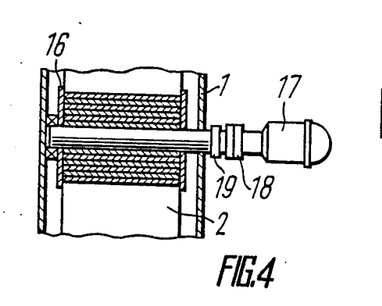
FIG. 4 is a schematic of a hoisting mechanism of the apparatus according to the invention.

The chamber 6 communicates through a valve 13 with the system 10 for discharging the clean medium. The chamber 5 can also communicate with a washing liquid system 15, when the apparatus is used for filtering liquids. Depending on the desired procedure, the medium to be filtered can be supplied through the camber 6, as represented in FIG. 3, as the washing liquid is introduced from the system 15 with reference to FIG. 2. In the latter modification the filter cake is washed and the surface of the hose is cleaned during leaking of the washing liquid under pressure through the material of the hose. The hoisting mechanism 3 comprises a drum 16 (FIG. 4) rotatable by an electric motor 17 the shaft of which is linked with the drum shaft through a coupling 18 and any known suitable means 19 for adjusting the torque of the drum, such as a ratchet-and-pawl mechanism, brought into action during lowering of the hose 2; lowering of the hose 2 taking place only at a predetermined pressure exerted on the hose 2 by filter cake accumulated in the annular cavity 8, of by the medium being cleaned, such as liquid or air in the chamber 5, if the apparatus is used for filtering liquid or air, respectively. The hose 2 can be wound onto the drum 16, or the end 7 of the hose 2 can be connected to a flexible pull element 20 in the form of a cable also to be reeled on the drum 16 (FIGS. 1 and 3).

The pull element 20 of the hoisting mechanins 3 is connected to the end 7 of the hose 2 through a flexible ring member 21 (FIG. 3) capable of bending on itself and serving as a lock for this end of the hose, this flexible ring member 21 being connected to the pull element 20 by suspension lines 22.

Filter cake is washed off the surface of the hose 2 after it has been raised (position of the raised hose shown in FIG. 3 by dash-dot lines) by jets 23 provided in the chamber 5 under the hoisting mechanism 3 and communicating by way of pipes 24 with the system 15 for feeding the washing liquid, normally the liquid being filtered, for which purpose the system 15 communicates with the system 9 (not shown).

Figure 5:
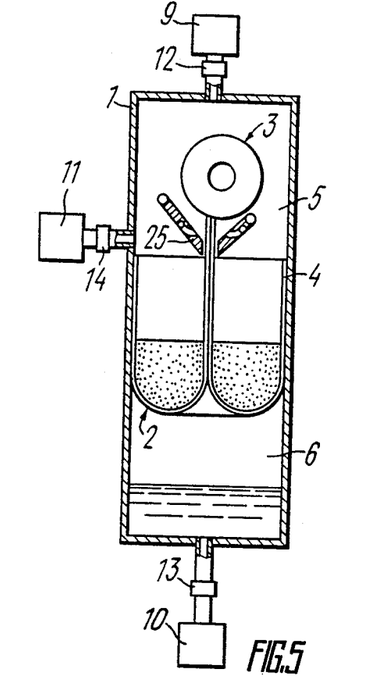
Figure 6:
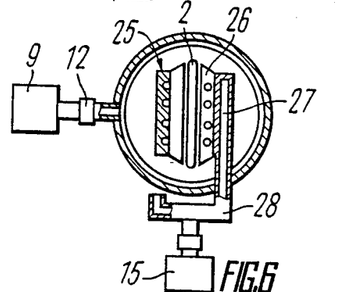
FIG. 6 is a partially sectional top view of scrapers of the apparatus according to the invention.

Arranged in the chamber 5 (FIG. 5) under the hoisting mechanism 3 are scrapers 25 located at both sides of the hose 2 and each having the form of a perforated plate 26 (FIG. 6) provided with an inner passage 27 communicating by a pipe 28 with the system 15 for feeding the washing liquid.

The end 4 of the hose 2 can be secured to the inside periphery of the housing 1 of the apparatus by any suitable means, such as by an adhesive or by fastening elements. The hose can also be attached to an annular projection 29 of the housing 1, as represented in FIG. 3.

It stands to reason that the proposed apparatus is equipped with all required elements, mechanisms and electrical controls ensuring its automatic operation, which are well known to those skilled in the art.

The proposed apparatus for filtering a fluid medium operates in the following manner.

The system 9 (FIGS. 2, 5, 7, 8 and 9) supplies to the chamber 5 of the housing 1 a fluid medium to be cleaned, which accumulates in the annular cavity 8 of the filter hose 2.

The filter hose 2 moves downwards only under the action of a predetermined pressure exerted by the medium being filtered and cake gathered in the cavity 8, and is controlled by the means 19.

The medium being cleaned flows through the filter hose 2, and is cleaned of mechanical impurities or solids deposited on its inside surface. As the quantity of filter cake deposited on the filter hose 2 grows, resistance to the filtration process increases. After the pressure in the annular cavity prevails over the moment of resistance to rotation of the drum 16, the latter turns, and a fresh surface of the filter hose 2 is admitted to the filtering zone. Subsequent to using all the filtering surface of the hose 2, a signal is delivered to the valve 12 to stop feeding the medium being filtered and engage the system 15 for supplying the washing liquid. This signal is also applied to the electric motor 17, which starts to rotate the drum for the filter hose 2 or pull element 20 to be wound thereon.

The filter hose 2 is raised and the washing liquid acting to remove filter cake from the surface of the hose 2 is forced with the cake to the system 11 for evacuating the cake, the scrapers 25 acting to remove the cake and clean the filtering surface during raising the hose 2.

After the filter hose 2 is completely raised to its top position (illustrated by the dash-dot line) another signal is delivered to deenergize the electric motor 17, open the valve 12, and close the valve 14, whereupon the cycle is repeated.

With respect to FIG. 3, the end 7 of hose 2 is attached to lines 22 of flexible ring member 21. When hose 2 is fully lowered, end 7 is opened so that the liquid to be filtered can flow through the opening. To filter the fluid, ring member 21 is lifted by pull element 20 so that ring member bends and compresses the hose end 7 shut. The fluid is then filtered through the hose and the filtered fluid removed by system 10. With the hose fully hoisted, the filter cake can be washed off and the surface of the hose cleaned by means of washing system 15 and filter cake evacuating system 11.

Figure 7:
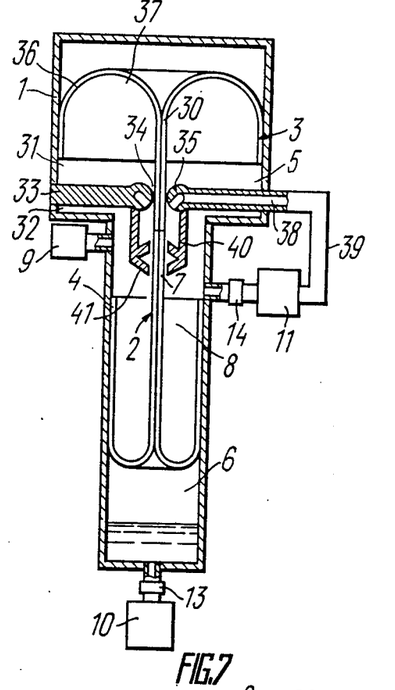

With reference to FIG. 7, the hoisting mechanism 3 can be alternatively fashioned as a hermetically sealed hose 30. Therewith, the chamber 5 is divided into two sections 31 and 32 by a partition 33 having a slot opening 34. Sealing elements 35 are disposed lengthwise of the slot opening 34. One end of the hose 30 is threaded through the slot opening 34 to be connected in the bottom section 32 of the chamber 5 to the end 7 of the hose 2 by any known suitable method. An opposite end 36 of the hose 30 is turned inside out and attached to the housing 1 at the top section 31 of the chamber 5 to form an annular chamber 37 overlying the partition 33 and filled with a compressible medium, such as air under pressure. The partition 33 has passages 38 communicating with the system 11 for evacuating filter cake by way of a pipe 39. The passages 38 communicate through the sealing elements 35 with the lower section 32 of the chamber 5.

Attached to the partition 33 at the side of the lower section 32 of the chamber 5 by means of brackets 40 are scrapers 41 arranged at both sides of the hose 2. The scrapers 41 can be fashioned as shown in FIG. 7, or can have the same construction as the scrapers 25 in FIG. 6.

This modification of the proposed apparatus operates as follows.

A fluid medium is admitted to the annular cavity 8 (FIG. 7) of the hose 2 wherethrough it is filtered. Part of the fluid medium delivered for cleaning passes through the scrapers 41 acting to remove filter cake from the surface of the hose as it moves. The thus removed filter cake is evacuated via the passage 38 and pipe 39 to the system 11.

The hose 2 moves relative to the scrapers 41 thanks to a pressure differene in the sections 31 and 32 of the chamber 5, this pressure difference causing the movement of the hose 30. The pressure difference is produced by the quantity of the fluid mediun supplied to the interior 8 of the hose 2 for cleaning.

After the hose 30 is brought to its lowest position and the air present in the interior 37 of the hose 30 is compressed to the maximum magnitude, then feeding the fluid medium to the hose 2 is stopped. The fluid medium is filtered through the hose 2 for the quantity of the medium in the annular cavity 8 to diminish, whereby the pressure exerted by the fluid medium on the air present in the cavity 37 is reduced accordingly. The pressure of air present in the annular cavity 37 of the hose 30 makes the hose 30 move upwards. After the hose 30 is brought to its topmost position, the pressure of air is minimized, the system 9 is engaged, and the fluid medium being filtered is fed to the annular cavity 8 of the hose 2.

Figure 8:
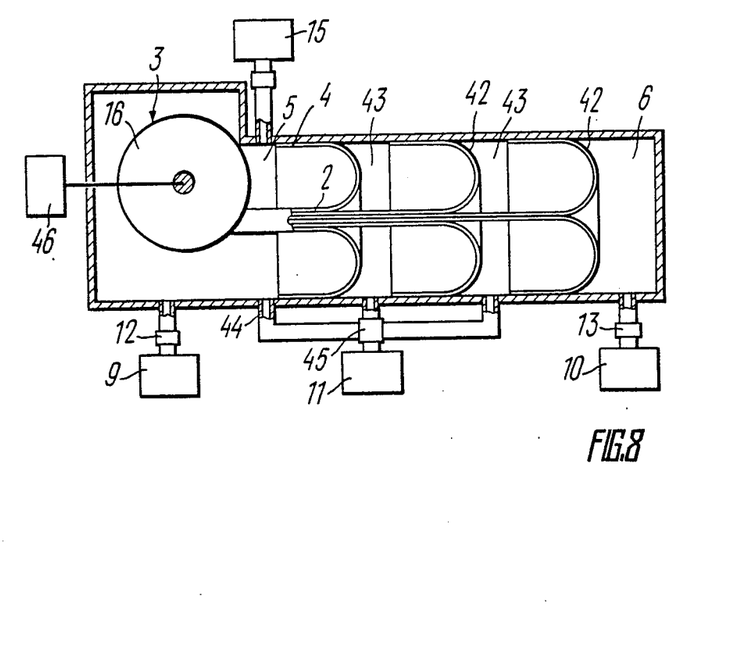

Referring now to FIG. 8, the filter hose 2 accommodates coaxially arranged additional hoses 42 fabricated from materials of various thickness to ensure a more thorough cleaning of the fluid medium. Ends of the additional hoses 42 are turned inside out, as is the hose 2, and are spaced along the length of the housing 1 to be successively attached to the inside surface thereof in any known suitable manner, thereby forming annular chambers 43. Each such annular chamber 43 communicates through pipes 44 and a non-return valve 45 with the system 11 for evacuating filter cake. Because the fluid medium to be cleaned is supplied under pressure, the apparatus can be disposed horizontally as seen best in FIG. 8.

With this arrangement of the flexible filtering element the fluid medium to be cleaned passes successively through the hoses 2 and 42. In each successive annular cavity 43 impurities of definite size tend to deposit on the surface of the hoses, whereas the clean fluid medium is discharged from the chamber 6 to the system 10. Under the action of the pressure of the fluid medium being filtered and the build-up of filter cake the drum 16 is caused to turn, and the hoses 2 and 42 turn inside out to move lengthwise of the housing of the apparatus thus bringing fresh portions of the hoses for the filtration process. After the last hose 42 downstream of the filtration process occupies entirely the chamber 6, a signal is generated for energizing the electric motor 17, and the drum 16 starts rotating in the opposite direction to reel the hoses thereon and reduce the volume of the annular cavities 43, whereas the fluid medium continues to be filtered, while filter cake is forced from the cavities 43 by the hoses to the system 11 for evacuating filter cake along pipes 44.

The additional hoses 42 can be fabricated from any known suitable electroconductive material and wired to an outside power source 46 producing a magnetic or electrostatic field, the housing 1 being preferably made of an electrically insulating material. In the course of filtering metallic impurities and solids carrying an electric charge tend to deposit on the filtering surface of the hoses and be discharged to the system 11 during the return travel of the hoses with the source of electric or magnetic field being deenergized.

Figure 9:
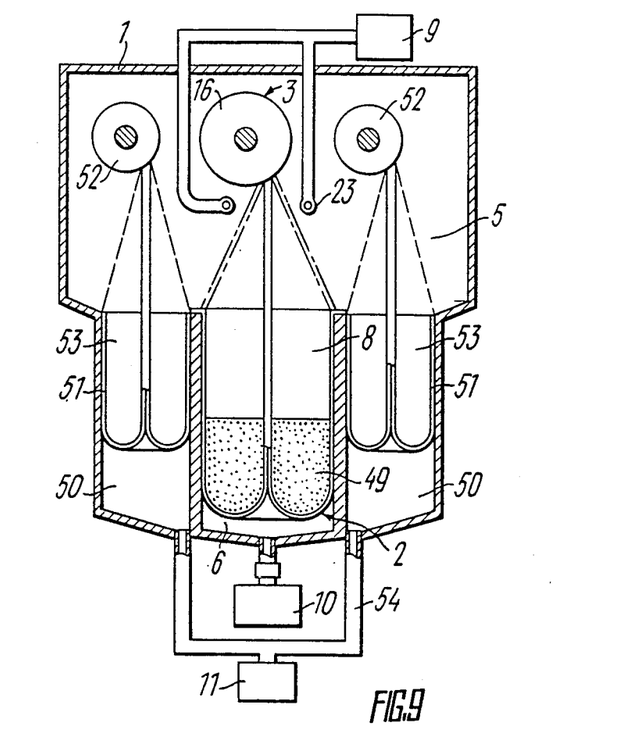
Figure 10:
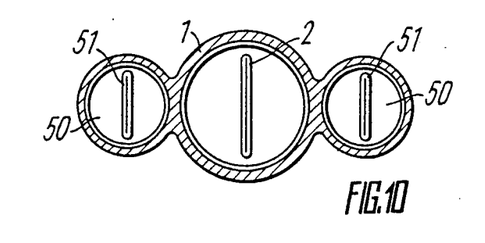
FIG. 10 is a schematic representation of the position of additional vessels relative to the housing of the apparatus shown in FIG. 9.

According to one more alternative embodiment of the proposed apparatus represented in FIG. 9, the annular cavity 8 of the hose 2 accommodates a filtering filter material 49, such as a fibrous material, sand, slag, or the like. The housing 1 has additional vessels 50 disposed as seen best in FIG. 10 and communicating with the chamber 5 arranged above the hose 2 (FIG. 9).

Each such additional vessel 50 contains a means for washing the filtering filler 49 including a flexible hose 51 also fabricated from a filtering material, and a drive drum 52 on which one end of the flexible hose is secured, the other end of such hose 51 being turned inside out and affixed to the periphery of the inside wall of the additional vessel 50 to form a cavity 53. Each additional vessel 50 communicates in its bottom portion with the system 11 for evacuating filter cake.

The drive of the drum 52 is reversible.

This modified form of the proposed apparatus operates substantially as heretofore described with reference to modifications represented in FIGS. 1 to 4. However, in the course of the filtration process, as excessive amount of filter cake builds up on the filtering filler 49, this filler 49 is washed. For this purpose the hose 2 is raised by the hoisting mechanism 3 to the topmost position as shown by the dash-dot line, and a washing liquid or the fluid medium being cleaned is fed through the jets 23. Under the action of the washing liquid and the force of gravity the filtering filler 49 is washed off the surface of the hose 2 to fall into the annular cavity 53 of the flexible hoses 51.

The drums 52 rotate to reciprocate the hoses 51 inside the additional vessels 50 for the filtering filler to be thereby washed by the liquid admitted from the system 9. Subsequent to washing the filler and stopping the action of the drums 52, the hoses 51 are fixed in the topmost position (indicated by the dotted lines), and the filler 49 dumps again into the annular cavity 8 of the hose 2 for the process to recommence.

INDUSTRIAL APPLICABILITY

The apparatus according to the invention is most preferable for use when cleaning waste and fecal water. It can also find application for removing solid inclusions from drinking water, and for gas dedusting. In some instances the apparatus can be used for filtering highly contaminated liquids.

We claim

1. A batch-action apparatus for filtering a fluid medium, comprising:
   a sealed housing;
   at least one flexible filtering element comprising an open ended generally cylindrical hose having a first end, which is turned inside out and secured along an inner perimeter of said housing at a point of attachment, and a second end, means connecting said second end to a hoisting mechanism, actuation means for driving said hoisting mechanism, said filtering element defines an annular cavity and divides the housing into an upper chamber and a lower chamber, said hoisting mechanism is positioned in the upper housing so that the second end is movable relative to the point of attachment so that the volume of the annular cavity can be changed;
   a means for feeding a fluid medium to be filtered in fluid communication with the upper chamber;
   a means for removing the filtered medium in fluid communication with said lower chamber; and
   a means for removing the filter cake formed on the filtering element during filtration, said filter cake removimg means is in fluid communication with the upper chamber, means for supplying a washing fluid in fluid communication with said housing such that when said washing liquid is fed to said housing the liquid dislodges the filter cake from the filtering element and the means for removing the filter cake removes the filter cake from the housing.

2. An apparatus as claimed in claim 1, wherein said connection means comprises a flexible pull member and wherein the hoisting mechanism comprises a drive drum having the flexible pull member wound thereon, said pull member being connected to the second end of the filtering element, a means for adjusting the torque of the drum, and a coupler connecting the actuation means and the means for adjusting torque so that the drive drum can be rotated.

3. An apparatus as claimed in claim 1, wherein scrapers, in the form of perforated plates, having an inner passage in fluid communication with the means for supplying a washing fluid, are arranged under said hoisting mechanism on exterior sides of the filtering element at an inclination thereto.

4. An apparatus according to claim 3, wherein the annular cavity is filled with filtering filler.

5. An apparatus as claimed in claim 1, wherein the upper chamber above the filtering element is divided into an upper portion and a lower portion by a partition wall having a slot opening with sealing elements extending lengthwise on the opening, the upper portion of the upper chamber accommodating the hoisting mechanism, said hoisting mechanism is fashioned as a hermetically sealed additional flexible element having a connecting end that passes through the slot opening of the partition wall to extend to the lower portion of the upper chamber and connected to the second end of the filtering element, the other end of the additional flexible element being attached to the periphery of the inside surface of the housing thus forming an annular chamber, above the partition wall, means to supply a compressible fluid under pressure to said annular chamber so that the hoisting mechanism can be actuated.

6. An apparatus as claimed in claim 5, wherein the partition wall has passages in fluid communication with the means for evacuating filter cake and extending to the lower portion of the upper chamber so as to accomodate, at exterior sides of the filtering element, scrapers secured on the partition wall.

7. An apparatus as claimed in claim 1, wherein an interior side of the filtering element accommodates coaxially at least one additional flexible filtering element hoses with ends of the additional filtering element being turned inside out to be successively attached to the inside periphery of the housing and form annular chambers communicating with the means for removing the filter cake.

8. An apparatus as claimed in claimed 7, wherein the additional filtering element is fabricated from an electrically conductive material and connectable to an outside power source.

9. An apparatus as claimed in claim 1, wherein the means for supplying a washing fluid is in fluid communication with the lower chamber.

10. An apparatus as claimed in claim 1, wherein the annular cavity of the filtering element is occupied by a filtering filler, the housing accomodating additional vessels communicating with the upper chamber of the housing disposed above the filtering element, each these vessels communicating in a bottom portion with the means for removing filter cake and being provided with a means for washing the filtering filler in the form of a flexible hose and a rotatable drive drum on which one end of such flexible hose is secured, the other end of this flexible hose being turned inside out and attached about the inside periphery to walls of the additional vessels.

11. A batch-action apparatus for filtering a fluid medium, comprising:
   a sealed housing;
   at least one flexible filtering element comprising an open ended generally cylindrical hose having a first end, which is turned inside out and secured along an inner perimeter of said housing at a point of attachment, and a second end, means connecting said second end to a hoisting mechanism, actuation means for driving said hoisting mechanism, said filtering element defines an annular cavity and divides the housing into an upper chamber and a lower chamber, said hoisting mechanism is positioned in the upper housing so that the second end is movable relative to the point of attachment so that the volume of the annular cavity can be changed;
   a means for feeding a fluid medium to be filtered in fluid communication with the lower chamber;
   a means for removing the filtered medium in fluid communication with said lower chamber; and
   a means for removing the filter cake formed on the filtering element during filtration, said filter cake removing means is in fluid communication with the upper chamber, means for supplying a washing fluid in fluid communication with said housing such that when said washing liquid is fed to said housing the liquid dislodges the filter cake from the filtering element and the means for removing the filter cake removes the filter cake from the housing.

12. An apparatus as claimed in claim 11, wherein jet injectors are arranged under said hoisting mechanism around the second end of the filtering element, said jet injectors are in fluid communication, via tubular members, with the means for supplying the washing liquid, so that the washing liquid can be directed onto the filtering element being raised there through.

13. An apparatus as claimed in claim 12, wherein said connecting means comprises a flexible pull member having a first and second end and a flexible ring element, said member connected to the hoisting mechanism at said member's first end, and connected at said member's second end to the flexible ring element attached to the second end of the filtering element, said ring element defines an aperture which is open when the filtering element is in a lowered position so that the medium to be filtered can be retained by the cavity and closed when the filtering element is in a raised position.

* * * * *

UNITED STATES PATENT AND TRADEMARK OFFICE
CERTIFICATE OF CORRECTION

PATENT NO. : 4,925,550

DATED : May 15, 1990

INVENTOR(S) : Shishkin et al

It is certified that error appears in the above-identified patent and that said Letters Patent is hereby corrected as shown below:

Title Page 1, Left Column insert Item -- [73] Assignee: INZHENERNY TSENTR "TRUBOPROVOD" --.

Title Page 1, Left Column Item "[22] PCT Filed:" "12" should be -- 19 --.

Signed and Sealed this

Nineteenth Day of February, 1991

Attest:

HARRY F. MANBECK, JR.

*Attesting Officer*          *Commissioner of Patents and Trademarks*